US011602951B2

(12) United States Patent
Sabeti et al.

(10) Patent No.: US 11,602,951 B2
(45) Date of Patent: Mar. 14, 2023

(54) SPLINED DRUM AND ELECTRIC MOTOR ENGAGEMENT ASSEMBLY

(71) Applicant: Bendix Commercial Vehicle Systems LLC, Elyria, OH (US)

(72) Inventors: Manouchehr Sabeti, Avon, OH (US); Daniel E. Banks, Climax, MI (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 643 days.

(21) Appl. No.: 16/799,331

(22) Filed: Feb. 24, 2020

(65) Prior Publication Data

US 2021/0260918 A1    Aug. 26, 2021

(51) Int. Cl.
*B60B 27/00* (2006.01)
*H02K 7/00* (2006.01)
(Continued)

(52) U.S. Cl.
CPC ...... *B60B 27/0057* (2013.01); *B60B 27/0015* (2013.01); *B60B 27/0047* (2013.01);
(Continued)

(58) Field of Classification Search
CPC ............ B60B 27/0057; B60B 27/0015; B60B 27/0047; B60B 2320/10; B60K 7/0007;
(Continued)

(56) References Cited

U.S. PATENT DOCUMENTS 2,687,192 A    8/1954  Butterfield
2,973,843 A    3/1961  Layon
(Continued)

FOREIGN PATENT DOCUMENTS

CN    101312305 A    11/2008
CN    201779180 U    3/2011
(Continued)

OTHER PUBLICATIONS

International Preliminary Report on Patentability (PCT/IB/326 & PCT/IB/373) issued in PCT Application No. PCT/US2021/019148 dated Sep. 9, 2022, including Written Opinion (PCT/ISA/237) issued in PCT Application No. PCT/US2021/19148 (nine (9) pages).
(Continued)

*Primary Examiner* — James M Dolak
*Assistant Examiner* — James J Triggs
(74) *Attorney, Agent, or Firm* — Crowell & Moring LLP

(57) ABSTRACT

The rotor of an electric motor unit has a web portion partially enclosing the remainder of the unit and terminating in a circumferentially extending rim. The brake drum defines an engagement surface for drum brake linings, and has an outboard end defining a flange securable to the wheel hub. The brake drum also includes an open inboard end, partly covered over by a dust guard, and a circumferential wall extending between the outboard and inboard ends and surrounding the engagement surface. By way of keys and slots or recesses, a reinforcing ring interlocks the circumferentially extending rim of the web portion and the circumferential brake drum wall. The reinforcing ring is secured to the circumferentially extending rim and to the wall of the brake drum at a location disposed axially between the rim of the web portion and the brake drum lining engagement surface.

21 Claims, 4 Drawing Sheets

(51) Int. Cl.
*H02K 7/102* (2006.01)
*B60K 7/00* (2006.01)
*B60T 1/06* (2006.01)
*F16D 65/827* (2006.01)

(52) U.S. Cl.
CPC ............ *B60K 7/0007* (2013.01); *B60T 1/067* (2013.01); *F16D 65/827* (2013.01); *H02K 7/006* (2013.01); *H02K 7/102* (2013.01); *B60B 2320/10* (2013.01); *B60K 2007/0038* (2013.01); *B60K 2007/0092* (2013.01); *B60Y 2200/91* (2013.01)

(58) Field of Classification Search
CPC ............ B60K 2007/0038; B60T 1/067; F16D 65/827; H02K 7/102; B60Y 2200/91
See application file for complete search history.

(56) References Cited

U.S. PATENT DOCUMENTS

| | | | |
|---|---|---|---|
| 4,913,258 A | | 4/1990 | Sakurai et al. |
| 4,989,697 A | | 2/1991 | Denton |
| 5,474,160 A | | 12/1995 | Siegrist |
| 6,286,639 B1 | | 9/2001 | Uhlig |
| 6,371,259 B1 | | 4/2002 | Handa et al. |
| 6,698,557 B2 | | 3/2004 | Hayes et al. |
| 8,459,386 B2 | | 6/2013 | Pickholz |
| 9,322,446 B2 | | 4/2016 | Plantan et al. |
| 9,381,802 B2* | | 7/2016 | Figuered ............. B60K 17/356 |
| 9,841,094 B2* | | 12/2017 | Monteiro De Lima ................... F16H 47/08 |
| 10,054,177 B2 | | 8/2018 | Emmons |
| 11,376,952 B1* | | 7/2022 | Shin ...................... B60K 17/145 |
| 2002/0166311 A1 | | 11/2002 | Maricq et al. |
| 2003/0178270 A1 | | 9/2003 | Vollert et al. |
| 2010/0116573 A1* | | 5/2010 | Kim ........................ F16D 51/00 180/65.51 |
| 2010/0270093 A1* | | 10/2010 | Sagara ................... H02K 7/102 310/43 |
| 2011/0094807 A1* | | 4/2011 | Pruitt ...................... B60L 50/40 180/65.6 |
| 2013/0098697 A1 | | 4/2013 | Power et al. |
| 2013/0218436 A1* | | 8/2013 | Kirby ........................ H02P 6/16 310/67 R |
| 2014/0102838 A1 | | 4/2014 | Plantan et al. |
| 2014/0152076 A1* | | 6/2014 | Vogler ................. B60L 15/2036 301/6.5 |
| 2014/0159468 A1* | | 6/2014 | Heinen ..................... B60L 7/14 301/6.5 |
| 2015/0108823 A1* | | 4/2015 | Figuered ............. B60B 27/0068 301/6.5 |
| 2016/0121709 A1* | | 5/2016 | Shin ........................ B60T 11/10 301/6.5 |
| 2017/0058975 A1 | | 3/2017 | Szewczyk et al. |
| 2018/0355934 A1* | | 12/2018 | Emmons ................. F16D 65/08 |
| 2019/0128350 A1 | | 5/2019 | Goodell |
| 2019/0383340 A1* | | 12/2019 | Seaman .............. B60B 27/0052 |
| 2020/0044514 A1* | | 2/2020 | Banks ..................... B60L 50/00 |
| 2021/0260918 A1 | | 8/2021 | Sabeti et al. |

FOREIGN PATENT DOCUMENTS

| | | |
|---|---|---|
| CN | 102259556 A | 11/2011 |
| CN | 202130244 U | 2/2012 |
| CN | 202628898 U | 12/2012 |
| CN | 204121629 U | 1/2015 |
| CN | 103511513 B | 5/2016 |
| CN | 103362996 B | 9/2016 |
| CN | 106195063 A | 12/2016 |
| CN | 205991119 U | 3/2017 |
| CN | 107042754 A | 8/2017 |
| CN | 107965537 A | 4/2018 |
| CN | 207374108 U | 5/2018 |
| CN | 108730379 A | 11/2018 |
| CN | 109372915 A | 2/2019 |
| CN | 109681552 A | 4/2019 |
| CN | 208919155 U | 5/2019 |
| JP | 2007-155076 A | 6/2007 |
| JP | 2009-41749 A | 2/2009 |
| JP | 5534934 B2 | 7/2014 |
| KR | 1999-0031738 U | 7/1999 |
| KR | 10-2006-0073913 A | 6/2006 |
| KR | 10-2008-0036385 A | 4/2008 |
| KR | 10-2012-0022168 A | 3/2012 |
| KR | 10-2013-0119300 A | 10/2013 |
| KR | 10-1330694 B1 | 11/2013 |
| KR | 10-2014-0081397 A | 7/2014 |
| KR | 10-2014-0083811 A | 7/2014 |
| WO | WO 2009/086884 A1 | 7/2009 |
| WO | WO 2013/025096 A1 | 2/2013 |
| WO | WO 2015/092743 A2 | 6/2015 |

OTHER PUBLICATIONS

Cover page of EP 3 083 307 A0 published Oct. 26, 2016 (one (1) page).
U.S. Appl. No. 16/051,628, filed Aug. 1, 2018.
International Search Report (PCT/ISA/220 and PCT/ISA/210) issued in PCT Application No. PCT/US2021/013647 dated Mar. 31, 2021 (three (3) pages).
Written Opinion (PCT/ISA/237) issued in PCT Application No. PCT/US2021/013647 dated Mar. 31, 2021 (nine (9) pages).
United States Non-Final Office Action issued in U.S. Appl. No. 16/745,728 dated May 25, 2022 (11 pages).
International Search Report (PCT/ISA/210) issued in PCT Application No. PCT/US2021/019148 dated May 19, 2021 (three (3) pages).
Written Opinion (PCT/ISA/237) issued in PCT Application No. PCT/US2021/019148 dated May 19, 2021 (seven (7) pages).
International Preliminary Report on Patentability (PCT/IB/326 & PCT/IB/373) issued in PCT Application No. PCT/US2021/013647 dated Jul. 28, 2022 and Written Opinion (PCT/ISA/237), filed on Apr. 14, 2021 (11 pages).

* cited by examiner

SPLINED DRUM AND ELECTRIC MOTOR ENGAGEMENT ASSEMBLY

CROSS REFERENCE TO RELATED APPLICATION

Cross reference is hereby made to commonly assigned U.S. patent application Ser. No. 16/051,628, titled DRUM BRAKE APPARATUS FOR A VEHICLE AIR BRAKING SYSTEM AND METHOD OF ASSEMBLING THE SAME, filed Aug. 1, 2018, as well as to commonly assigned U.S. patent application Ser. No. 16/745,728, titled ELECTRIC VEHICLE DRUM BRAKE DUST EVACUATION AND COOLING CONCEPT, filed Jan. 17, 2020, which identifies as inventors the same individuals as the present case.

BACKGROUND OF THE INVENTION

Field of the Invention

The present invention concerns a drum brake assembly for use with a wheel end electric drive motor in a commercial vehicle drive train.

Description of Related Art

Chinese Publication CN 107042754 A and PCT International Publication WO 2009/086884 A1 concern wheel hubs including particular motor and brake arrangements. Other non-U.S. publications that may be of interest are Chinese Publication CN 207374108 U, Japanese Publication 2007-155076 A, Korean Publications 10-2012-0022168, 10-2014-0081397 and 10-2014-0083811, and PCT International Publication WO 2013/025096 A1. U.S. Patent Application Publication US 2017/0058975 A1 to Szewczyk et al., U.S. Pat. No. 6,286,639 B1 to Uhlig, and U.S. Pat. No. 8,459,386 B2 to Pickholz may all be of interest as well.

SUMMARY OF THE INVENTION

A drum brake assembly such as that mentioned above requires an extended drum that reaches from the outboard surface of the wheel hub, inboard over the electric drive motor, and further inboard to interface with the drum brake, located on the inboard side of the motor. In such an arrangement, the extended drum length could cause a loss of torsional rigidity in the drum, potentially causing poor braking performance and noise issues. The multiple key features of the extended length drum provided according to the present invention engage with mating slot features of the electric motor rotor and serve to support the center of the circumferential portion of the extended length drum. This engagement of the key and slot features provides both torsional and radial stiffness, which should improve braking performance, address noise issues, and allow for a lighter weight drum than would be required without these features.

In one preferred configuration, a brake drum and electric motor engagement assembly for a vehicle includes a wheel hub mounted for rotation around a wheel spindle, an electric motor unit having an electric motor rotor, an electric motor stator, and power electronics, a brake drum, and a reinforcing ring. The electric motor rotor includes a web portion configured to partially enclose the remainder of the electric motor unit and terminate in a circumferentially extending rim. The brake drum defines an engagement surface for drum brake linings, and has an outboard end securable to the wheel hub, an open inboard end, and a circumferential wall extending between the outboard and inboard ends and surrounding the engagement surface. The reinforcing ring interlocks the circumferentially extending rim of the web portion and the circumferential wall of the brake drum, and is secured to the circumferentially extending rim and to the circumferential wall of the brake drum at a location that is disposed axially between the rim of the web portion and the engagement surface of the brake drum.

The assembly can include keys projecting into slots to interlock the circumferentially extending rim and the circumferential wall of the brake drum. The keys could be defined on the brake drum and project radially inwardly, while the slots could be defined in the reinforcing ring and project radially inwardly. In one construction, the keys are disposed adjacent to openings distributed around the circumferential perimeter of the brake drum, with the openings providing for ventilation of the brake drum and discharge of dust. The assembly can further include a support for brake shoes having the drum brake linings, and a dust guard mounted in the support plate inboard of the engagement surface. Each of the keys can be disposed between a pair of adjacent openings distributed around the circumferential perimeter of the brake drum. The invention additionally concerns a brake drum assembly per se, as well as a process of producing a brake drum and electric motor engagement assembly.

DESCRIPTION OF THE PREFERRED EMBODIMENTS

Figure 3:
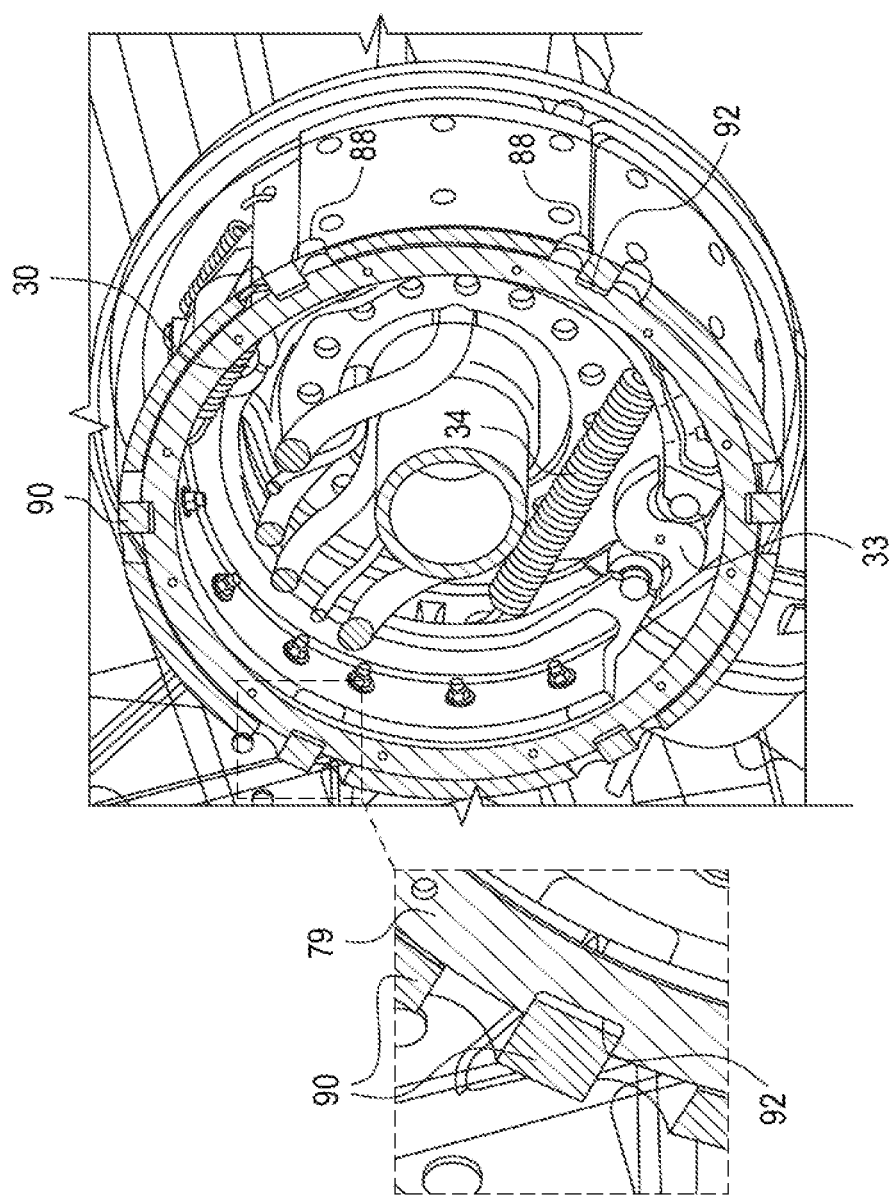
FIG. 3 is a part sectional view of the arrangement shown in FIG. 1 from a vehicle outboard side.
Figure 4:
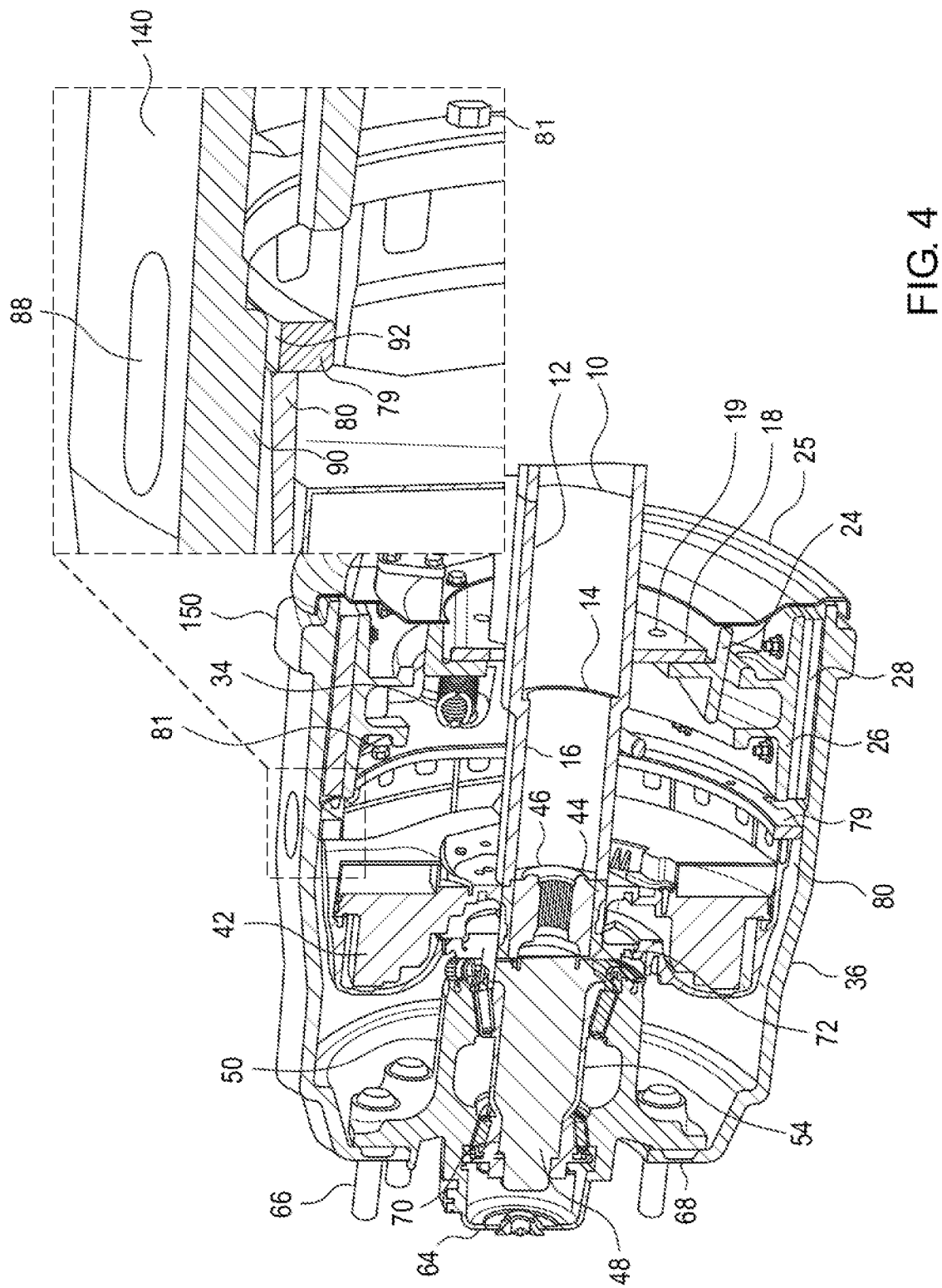
FIG. 4 is a view similar to that of FIG. 1 but illustrating the manner in which the end-of-axle arrangement may be attached to an axle tube.

Referring initially to FIG. 4, the wheel-end brake drum and electric motor brake or engagement assembly illustrated is mounted to an axle tube 10 having an inboard section 12 interconnected at a step 14 to a reduced diameter outboard section 16. An attachment flange 18 is shown as welded or otherwise secured to the inboard axle tube section 12. By way of bolts 19 passing through aligned holes 20 and 22 (FIG. 1), a support, here formed by a drum brake support plate 24, is securely attached to the flange 18 and the axle tube 10. A pair of drum brake shoes 26 having linings 28 are pivotally secured by way of at least one post 30 to the support plate 24 in typical fashion. A dust guard 25 is mountable to the support plate 24 by suitable fasteners 27 to minimize passage of liquid and road debris into the illustrated assembly as well as discharge of brake dust produced during braking out of the assembly and onto a vehicle exterior. Upon operation of an actuator 32 (FIGS. 1 and 2), a cam 33 (FIG. 3) is rotated in the conventional way to displace adjacent ends of the shoes 26 away from one another against the action of a return spring 34, causing the shoes 26 to pivot around the post 30 and forcing the linings 28 into contact with an inner circumferential friction surface 38 of a brake drum 36, described below. Attachment of the return spring to the brake shoes 26 is best visible in FIG. 3.

Suitable cables 40, passing through openings in the flange 18 and/or the support plate 24, permit communication of relevant vehicle controls (not shown) and a vehicle battery (not shown) with a schematically represented electric motor rotor, stator, and power electronics unit 42. By way of a sleeve 44, press fit, keyed to, or otherwise affixed to the rotor of the unit 42, and a splined fitting 46 secured to the outboard section 16 of the axle tube 10, the stator and power electronics portions of the unit 42 (not individually shown) are rigidly secured to the outboard section 16 of the axle tube 10, while the rotor of the unit 42 (not individually shown) is rotatable relative to the stator and power electronics portions of the unit 42. The splined fitting 46 is received within the sleeve 44, such that both the sleeve 44 and the splined fitting 46 are disposed axially with respect to the tube 10 between the reduced diameter outboard axle section 16 and an outer wheel spindle 48.

A wheel hub 50 is mounted by way of bearings 52 for rotation relative to the spindle 48. Inner bearing races 56 are defined on the exterior of a tubular bearing race insert 54 received over, extending around, and secured in any suitable manner to the spindle 48. Outer bearing races 58 respectively corresponding to the inner bearing races 56 mentioned are defined by suitably formed or machined surfaces on the wheel hub 50. The wheel hub 50 shown is a unitary cast or machined element including a hollow stem 60, a protective cap 64, and a flange 62, extending at least partly around the wheel hub 50 and located between the stem 60 and the cap 64. Threaded bolts 66, passing through aligned holes in the wheel hub flange 62 and a mounting flange 68 (FIG. 4) at the outboard end of the brake drum 36, are used, along with nuts received on the bolts 66, to secure the brake drum 36 and the wheel hub 50 together. The bolts 66 are also used to secure a wheel rim (not shown) to the wheel hub 50, with the mounting flange 68 of the drum 36 then being sandwiched between the wheel rim and the hub 50. A schematically illustrated split ring 70, receivable in a groove (not shown) circumferentially formed in the interior surface of the cap 64 of the wheel hub, can engage a dust blocking annular wall 74 formed on the insert 54 to retain the insert in proper axial position relative to the wheel hub 50 and the spindle 48. A dust seal 72 (FIG. 4) is also provided between the axially interior end of the stem 60 and the spindle 48. The seal 72 and the annular wall 74 serve to minimize effects of road debris and dust generated during vehicle braking on the bearings 52.

Figure 1:
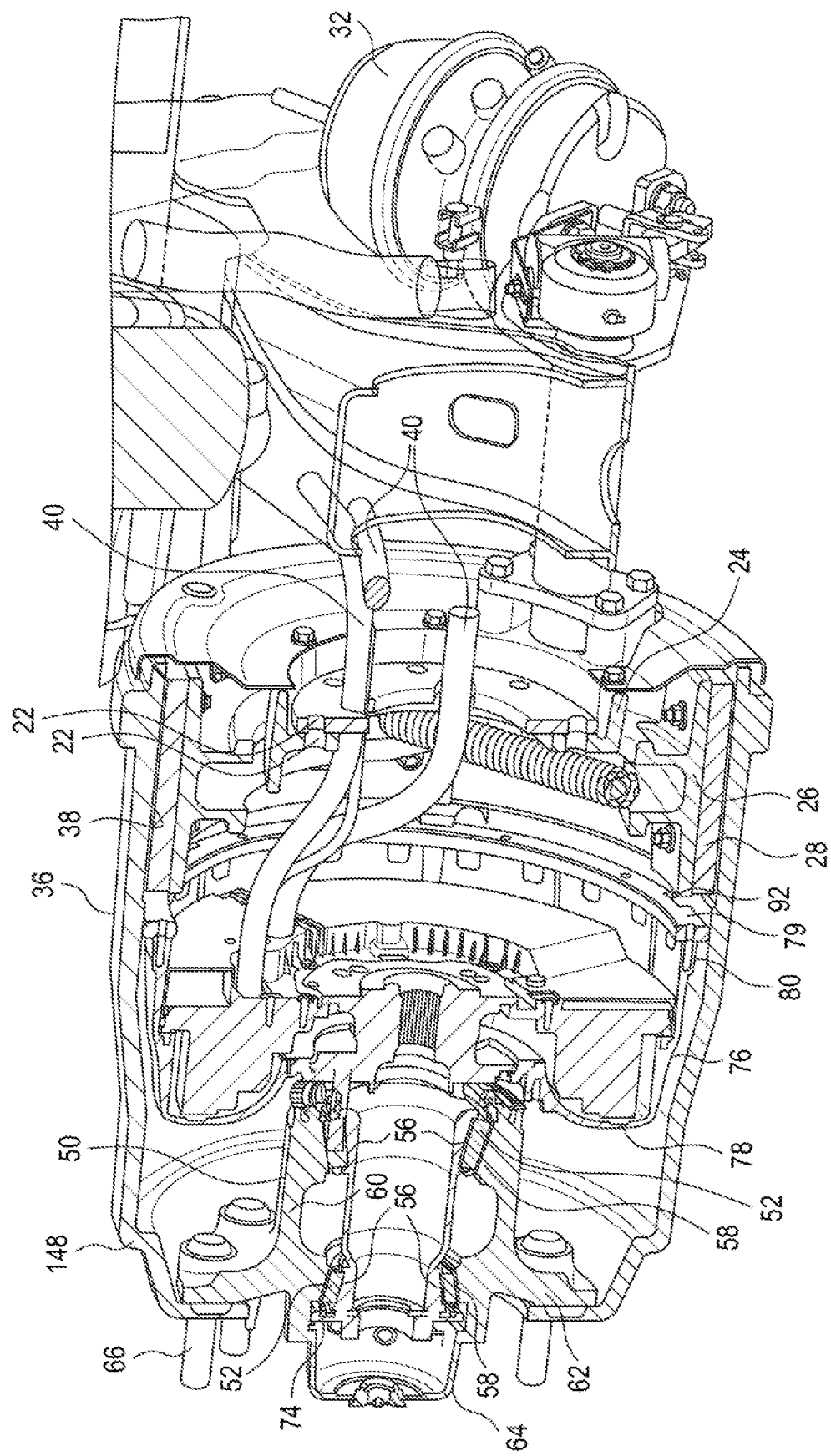
FIG. 1 is a lateral view, partly in section, of an outboard end of an end-of-axle arrangement incorporating a vehicle brake drum and electric motor engagement assembly according to the present invention.
Figure 2:
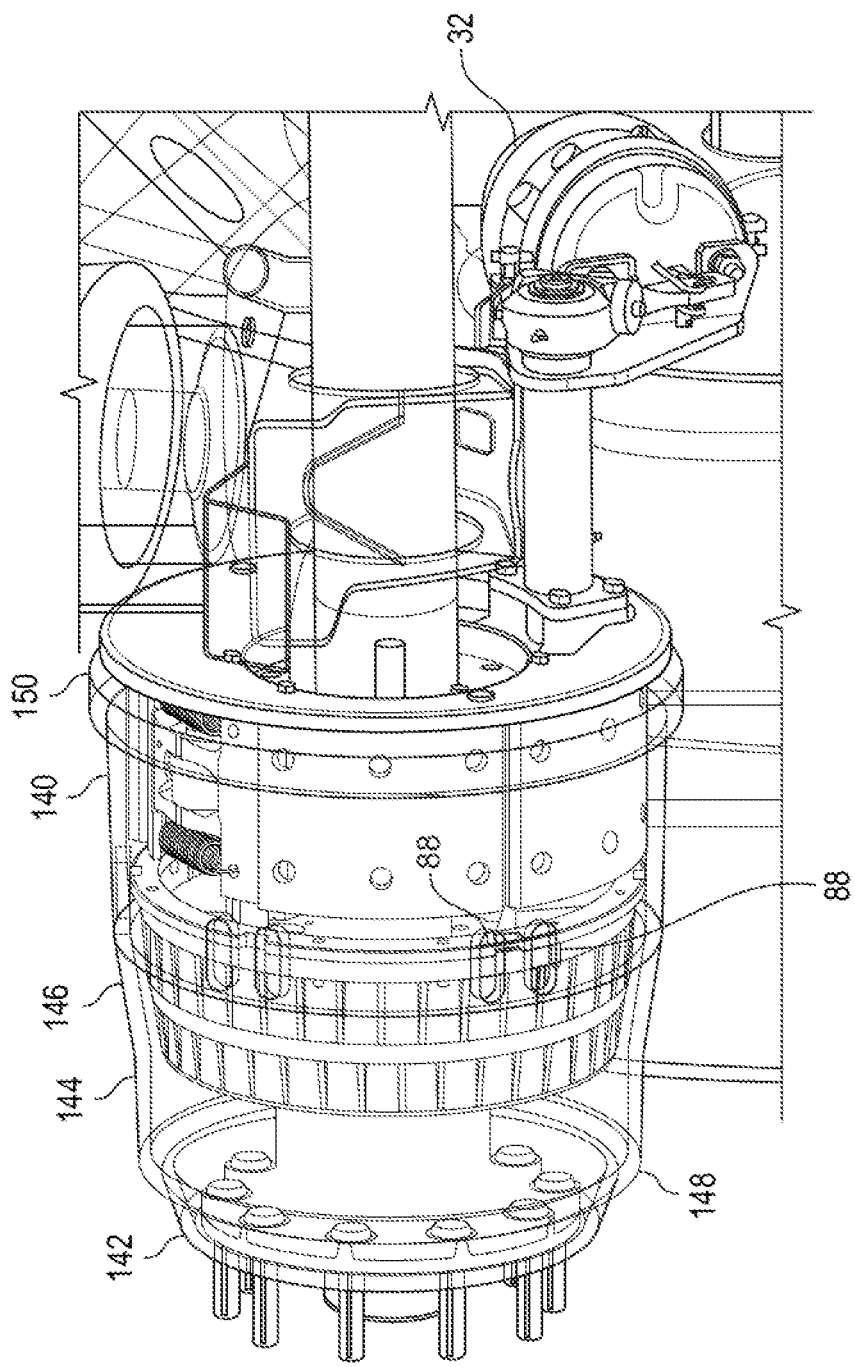
FIG. 2 is a lateral view similar to that of FIG. 1 but illustrating the exterior of the vehicle brake drum shown in FIG. 1.

Referring now to FIGS. 1-2, it will be seen that the drum 36 includes a large diameter inboard section 140, a small diameter outboard section 142 indicated in FIG. 2, an intermediate section 144 between the inboard and outboard drum sections 140 and 142, as well as tapered transition sections 146 and 148 respectively located between the inboard and intermediate drum sections 140 and 144 and the outboard and intermediate drum sections 142 and 144. A portion of the interior wall surface of the large diameter inboard section 140 forms the friction surface 38 engaged during braking by the brake linings 28. The inboard drum section 140 is shown as having a circumferentially extending reinforcing rib or bulge 150 extending around an end of the drum opposite the mounting flange 68. The rib or bulge 150 provides added strength to the drum 36, which might be required, as the elongated configuration of the drum 36 could possibly compromise torsional drum rigidity.

The rotor of the schematically represented electric motor rotor, stator, and power electronics unit 42 of the electric motor is secured to or formed together with a rotor section 76 including a substantially U-shaped web portion 78. The web portion 78 is configured to partially enclose the remainder of the unit 42. The rotor section 76 is rigidly secured in a particular manner to be described to the brake drum 36 so that the rotor section 76 rotates together with the drum. A suitable bearing/seal arrangement (not indicated) may be mounted between the web portion 78 and the sleeve 44 to enable relative rotation and to limit passage of any contaminants. In addition to partially enclosing the unit 42 of the electric motor, the web portion 78 extends axially with respect to the tube 10 inboard beyond the unit 42, defining an enlarged mounting rim 80 extending circumferentially around the inboard axial end of the web portion 78. A reinforcing ring 79 is secured by screws or other suitable fasteners 81 to the axial end surface of the rim 80, as best seen in FIGS. 1 and 4.

As shown in FIGS. 2-3, openings 88, referred to as key slots, are provided on each side of multiple keys 90, integrally formed with and distributed around the circumferential perimeter wall of the brake drum 36. Air is permitted to enter into the arrangement shown through the key slots 88. Air entering through the key slots 88 performs cooling and, to a certain extent, entrains dust generated during braking. The key slots 88 are located in pairs on opposite sides each of the keys 90. As most clearly illustrated in the enlarged portions of FIGS. 3 and 4, these keys 90 project inward radially relative to the brake drum and are received in corresponding radial recesses or slots 92 provided in the reinforcing ring 79 secured to the end surface of the rim 80. By having the keys 90 received in the recesses or slots 92 of the ring 79 as described, the brake drum 36 and the web portion 78 of the rotor section 76 are locked together for rotation, so that the brake drum 36 and the rotor section 76, and thus the brake drum and the rotor of the schematically represented unit 42, rotate together.

The extended length brake drum 36 is particularly suitable for use with a wheel end electric drive motor on a commercial vehicle. The drum 36 extends from an outboard mounting face on a wheel hub, here defined by the mounting flange 68, over the electric drive motor unit 42, and incorporates an inboard portion, here formed by the large diameter inboard section 140, that provides the friction surface 38. The drum projects axially inwardly beyond the plate 24, which forms a support for the drum brake located inboard of the electric motor. In the circumferential area of the drum that passes over the electric drive motor, the multiple key features engaging with the key slots 92 included in the overall rotor arrangement of the motor serve to support the extended length drum, both torsionally and radially, thereby improving braking performance, addressing noise issues, and allowing for a lighter weight drum.

The vehicle brake drum and electric motor engagement assembly described thus includes the wheel hub 50 mounted for rotation around a wheel spindle 48 and an electric motor unit 42, having an electric motor rotor, an electric motor stator, and power electronics (not individually shown), with the rotor of the unit 42 configured to include a web portion 78 partially enclosing the remainder of the electric motor unit 42 and terminating in a circumferentially extending rim 80. The brake drum 36 defines an engagement surface 38 for the drum brake linings 28, and has an outboard end, defining the flange 62, securable to the wheel hub 50 by way of the bolts 66. The brake drum also includes an open inboard end, partly covered over by the dust guard 25, and a circumferential wall, including drum sections 140, 142, 144, 146, and 148, extending between the outboard and inboard ends and surrounding the engagement surface 38. By way of the keys 90 and the slots or recesses 92, the reinforcing ring 79 interlocks the circumferentially extending rim 80 of the web portion 78 and the circumferential wall of the brake drum 36. The reinforcing ring 79 is secured, by way of fasteners 81 (FIG. 4) or in any other suitable manner, to the circumferentially extending rim 80 and to the circumferential wall of the brake drum 36 at a location, best seen in FIG. 4, disposed axially between the rim 80 of the web portion 78 and the engagement surface 38 of the brake drum 36.

The foregoing disclosure has been set forth merely to illustrate the invention and is not intended to be limiting. Since modifications of the disclosed embodiments incorporating the spirit and scope of the invention may occur to persons skilled in the art, the invention should be construed to include everything within the scope of the appended claims and equivalents thereof.

The invention claimed is:

1. A brake drum and electric motor engagement assembly for a vehicle, comprising:
   a wheel hub mounted for rotation around a wheel spindle,
   an electric motor unit having an electric motor rotor, an electric motor stator, and power electronics, the electric motor rotor including a web portion configured to partially enclose a remainder of the electric motor unit and terminate in a circumferentially extending rim,
   a brake drum defining an engagement surface for drum brake linings, the brake drum having an outboard end securable to the wheel hub, an open inboard end, and a circumferential wall extending between the outboard and inboard ends and surrounding the engagement surface,
   a reinforcing ring interlocking the circumferentially extending rim of the web portion and the circumferential wall of the brake drum, the reinforcing ring being secured to the circumferentially extending rim and to the circumferential wall of the brake drum,
   wherein the reinforcing ring is secured to the circumferential wall of the brake drum at a location disposed axially between the rim of the web portion and the engagement surface of the brake drum.

2. The brake drum and electric motor engagement assembly of claim 1, further comprising keys projecting into slots to interlock the circumferentially extending rim and the circumferential wall of the brake drum.

3. The brake drum and electric motor engagement assembly of claim 2, wherein the keys are defined on the brake drum and project radially inwardly.

4. The brake drum and electric motor engagement assembly of claim 2, wherein the slots are defined in the reinforcing ring and project radially inwardly.

5. The brake drum and electric motor engagement assembly of claim 2, wherein the keys are disposed adjacent to openings distributed around the circumferential perimeter of the brake drum.

6. The brake drum and electric motor engagement assembly of claim 5, wherein the openings provide for ventilation of the brake drum and discharge of dust.

7. The brake drum and electric motor engagement assembly of claim 1, further comprising a support for brake shoes having the drum brake linings, and a dust guard mounted in the support inboard of the engagement surface.

8. The brake drum and electric motor engagement assembly of claim 5, wherein each of the keys is disposed between a pair of adjacent openings distributed around the circumferential perimeter of the brake drum.

9. A brake drum assembly, the assembly comprising:
   an interface for receiving an electric motor unit,
   a brake drum defining an engagement surface for drum brake linings, the brake drum having an outboard end securable to a wheel hub, an open inboard end, and a circumferential wall extending between the outboard and inboard ends and surrounding the engagement surface, and
   keys for a reinforcing ring to interlock the electric motor unit and the circumferential wall of the brake drum, the keys disposed around the circumferential wall of the brake drum to secure the reinforcing ring and the electric motor unit to the circumferential wall of the brake drum,
   wherein the reinforcing ring is securable to the circumferential wall of the brake drum at a location disposed axially between the interface and the engagement surface of the brake drum.

10. The brake drum assembly of claim 9, wherein the keys project into slots to interlock the reinforcing ring and the circumferential wall of the brake drum.

11. The brake drum assembly of claim 10, wherein the keys project radially inwardly.

12. The brake drum assembly of claim 10, wherein the slots are defined in the reinforcing ring and project radially inwardly.

13. The brake drum assembly of claim 9, wherein the keys are disposed adjacent to openings distributed around the circumferential perimeter of the brake drum.

14. The brake drum assembly of claim 13, wherein the openings provide for ventilation of the brake drum and discharge of dust.

15. The brake drum assembly of claim 9, wherein the engagement surface is configured to surround a support for brake shoes having the drum brake linings, and a dust guard is mountable to the support inboard of the engagement surface.

16. The brake drum assembly of claim 13, wherein each of the keys is disposed between a pair of adjacent openings distributed around the circumferential perimeter of the brake drum.

17. A process of producing a brake drum and electric motor engagement assembly for a vehicle, comprising:
   securing an electric motor unit having an electric motor rotor, an electric motor stator, and power electronics to an axle tube, the electric motor rotor including a web portion configured to partially enclose a remainder of the electric motor unit and terminate in a circumferentially extending rim,
   attaching an outboard end of a brake drum defining an engagement surface for drum brake linings to a wheel hub mounted for rotation around a wheel spindle, the brake drum having an open inboard end and a circumferential wall extending between the outboard and inboard ends and surrounding the engagement surface, and
   securing a reinforcing ring to the circumferentially extending rim and to the circumferential wall of the brake drum to interlock the circumferentially extending rim of the web portion and the circumferential wall of the brake drum at a location disposed axially between the rim of the web portion and the engagement surface of the brake drum.

18. The process of claim 17, further comprising projecting keys into slots to interlock the circumferentially extending rim and the circumferential wall of the brake drum.

19. The process claim 18, wherein the keys are defined on the brake drum and project radially inwardly.

20. The process of claim 18, wherein the slots are defined in the reinforcing ring and project radially inwardly.

21. The process of claim 18, further comprising ventilating the brake drum and discharging dust via openings provided adjacent the keys.

* * * * *